Figure 8:
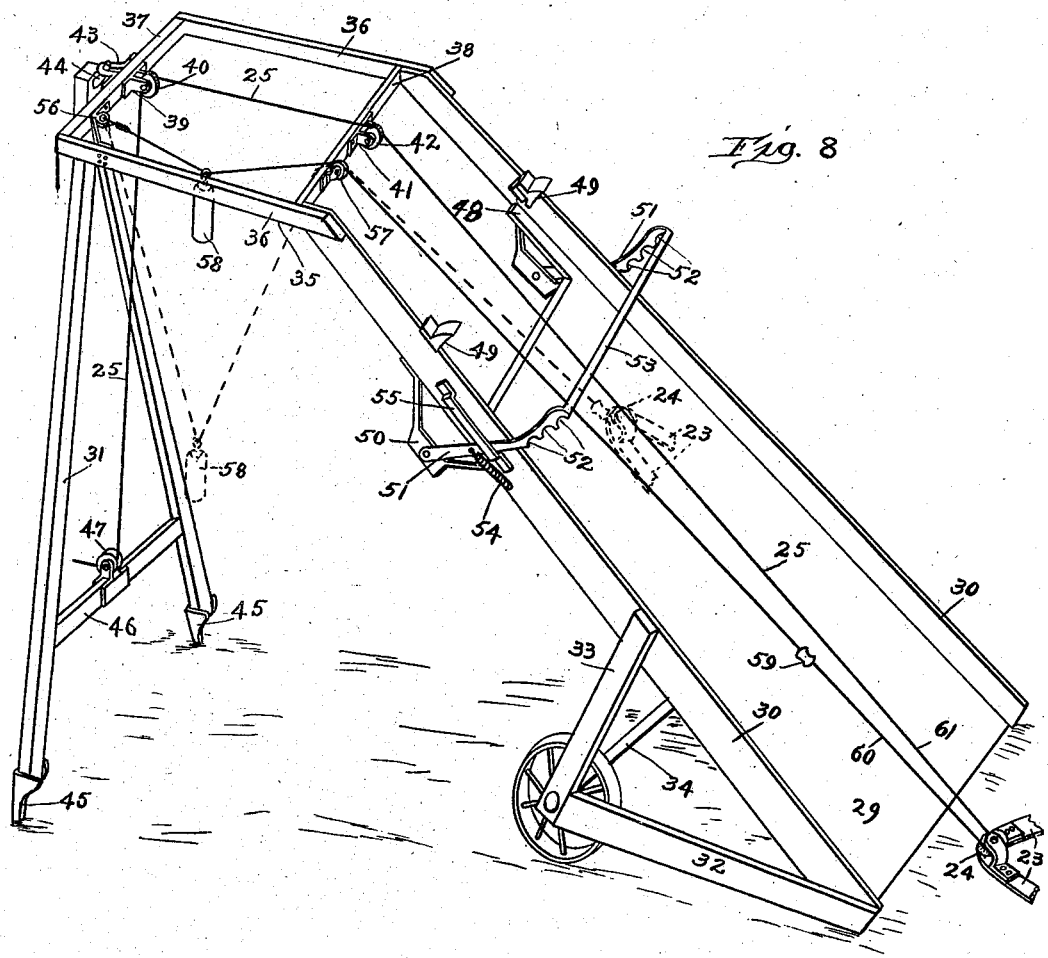

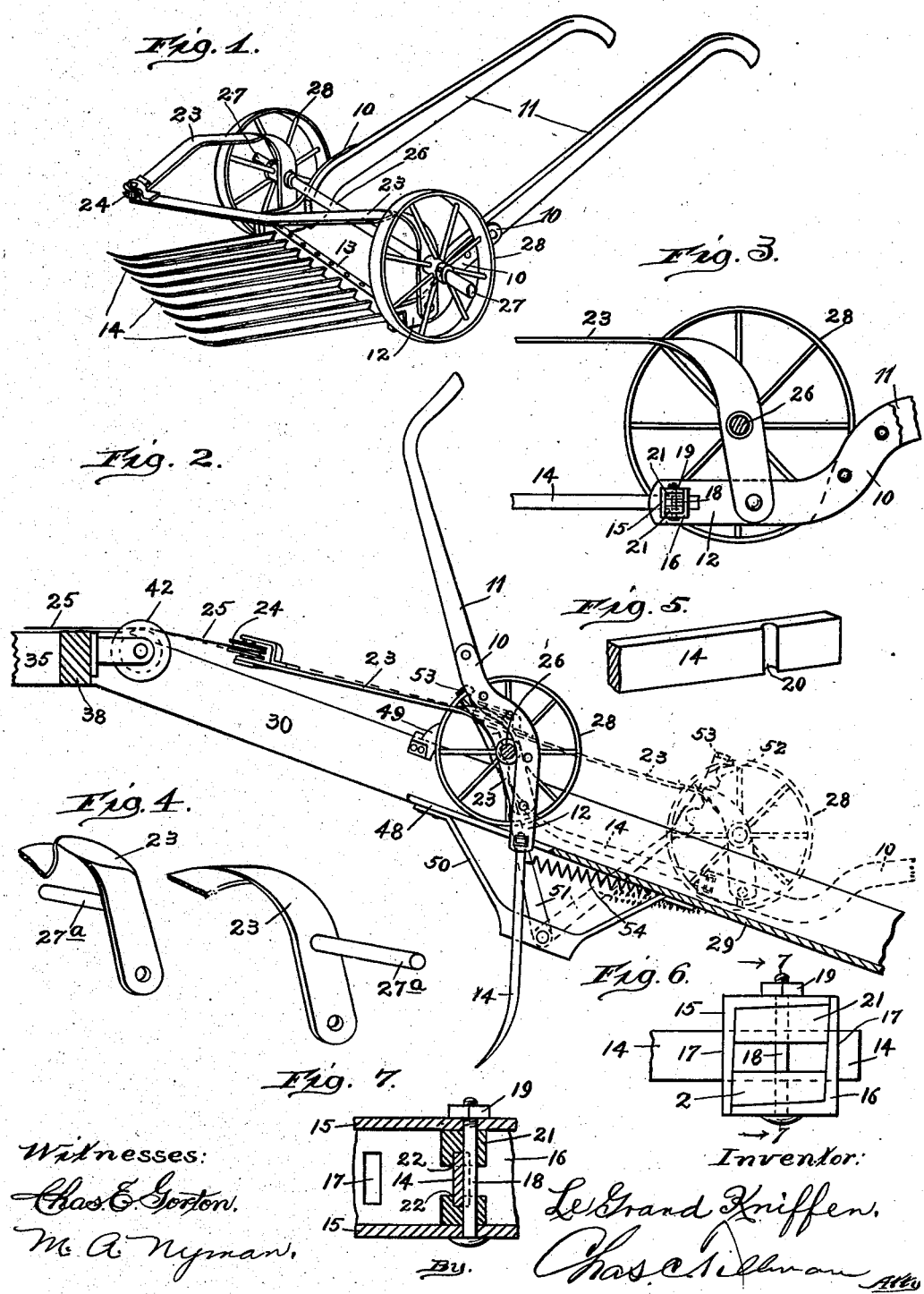

No. 893,251. PATENTED JULY 14, 1908.
LE GRAND KNIFFEN.
MANURE FORK OR CARRIER.
APPLICATION FILED NOV. 21, 1907.

2 SHEETS—SHEET 2.

Witnesses:
Chas. E. Gorton
M. A. Nyman

Inventor:
Le Grand Kniffen
By Chas. C. Tillman, Atty.

UNITED STATES PATENT OFFICE.

LE GRAND KNIFFEN, OF CHICAGO, ILLINOIS.

MANURE FORK OR CARRIER.

No. 893,251.  Specification of Letters Patent.  Patented July 14, 1908.

Application filed November 21, 1907. Serial No. 403,155.

*To all whom it may concern:*

Be it known that I, LE GRAND KNIFFEN, a citizen of the United States, residing at Chicago, in the county of Cook and State of Illinois, have invented certain new and useful Improvements in a Manure Fork or Carrier, of which the following is a specification.

This invention has relation to that type of implements used for collecting or scooping up and conveying material from one point to another, and is somewhat similar in construction and operation to the fork or carrier disclosed in Letters-Patent No. 844,524 issued to me on the 19th day of February, 1907, and like said device, while it is more especially designed to be used for handling barn-yard manure and in connection or coöperation with an improved loading apparatus, such as is set forth in Letters-Patent No. 835,624 issued to me on the 13th day of November, 1906, or in connection or coöperation with a loading apparatus for wagons and the like, for which I have executed an application for Letters-Patent of the United States on the 11th day of November, 1907, yet it is applicable for use without such apparatus or apparatuses, or with a loading apparatus of different construction and for handling and removing various kinds of material; and it consists in certain peculiarities of the construction, novel arrangement, and operation of the various parts thereof, as will be hereinafter more fully set forth and specifically claimed.

In my above-mentioned application for patent on loading apparatus for wagons and the like I have shown and described in connection with and as forming a part of the apparatus a fork or carrier of substantially the same construction (the tackle being omitted) as that forming the subject matter of the present application, but have not therein claimed said fork or carrier *per se*, or, rather, except in conjunction or in combination with the apparatus or as forming a part thereof, but will herein claim, the subject matter of the present invention and application therefor.

In my aforesaid patent No. 844,524 the fork or carrier is adapted to be drawn up an inclined chute by a rope or cable attached at one end to the bail of the carrier, and is so constructed as to be partially rotated or tilted when at the proper point on the chute to dump its load by means of the draft through the bail, in which construction the handles thereof, by reason of the draft through the bail, have a strong tendency to rise in the forward movement of accumulating a load on the carrier, thus causing great strain to the hands and arms of the operator.

The principal object of the present invention is to provide a fork or carrier which shall be simple and inexpensive in construction, strong, durable and effective in operation, and so made that it may be drawn by horse or other power over the ground to accumulate a load thereon and manually guided, and up an inclined chute, when desired, to a proper point on the upper portion of the chute where, by reason of its peculiar construction, it will automatically tilt or partially rotate and dump its load by reason of the gravity thereof and not through the draft of the bail, as in the construction described in the last-named patent, thus decreasing or entirely obviating the tendency of the handles of the carrier to rise in its forward movement and relieving the operator of great strain.

Still another object is to furnish means for sometimes gradually retarding then permanently stopping and permitting the carrier to dump its load, and then giving it a rearward movement so that it will descend on an inclined chute to its normal position at the lower end thereof.

A further object of the invention is to provide means for regulating the speed or movement of the carrier while it is collecting its load and while it is ascending the chute.

Various other objects and advantages of the invention will be disclosed in the subjoined description and explanation.

In order to enable others skilled in the art to which my invention pertains, to make and use the same, I will now proceed to describe it, referring to the accompanying drawings, which serve to illustrate the invention, and in which—

Figure 1 is a perspective view of a carrier embodying one form of the invention; Fig. 2 is a view partly in section and partly in elevation of the upper portion of an inclined chute of a loading apparatus, illustrating by continuous lines the carrier thereon in its tilted position and by dotted lines the position it will occupy while traveling up the inclined chute, and when about to be impeded in its upward progress; Fig. 3 is a fragmental side view of the carrier, showing one of the wheels thereof removed, and illustrating the construction of the cross-head which supports the tines and the manner of securing the latter therein; Fig. 4 is a fragmental perspective view of the rear portion of the arms of the bail detached from the carrier, showing a modification in the construction thereof; Fig. 5 is a perspective view of the rear portion of one of the tines of the carrier; Fig. 6 is an enlarged end view of the cross-head and a portion of one of the tines showing the manner of securing the same therein; Fig. 7 is a sectional view taken on line 7—7 of Fig. 6 looking in the direction indicated by the arrows; and Fig. 8 is a perspective view of a loading apparatus which may be used in conjunction with the carrier, and illustrating means for regulating the rate of speed at which the carrier may be drawn over the ground and up the inclined chute.

Like numerals of reference, refer to corresponding parts throughout the different views of the drawings.

The fork or carrier may be made of any suitable form, such as a scoop, scraper or fork for gathering and holding the manure or material, but, for the purpose of handling barn-yard manure which contains straw, hay and other fibrous material, I prefer to construct it with tines as shown in the drawings accompanying this application, but I desire it understood that I may substitute a scoop, shovel or scraper therefor without departing from the spirit of the invention. The fork or carrier consists of a material-supporting body-portion comprising two spaced apart upwardly extending side members 10 which are counterparts of one another and are preferably of about the shape shown. Secured to each of these members is a handle 11, which project rearwardly and upwardly and are for the use of the operator in guiding the carrier when the same is being loaded or filled. On a front and forwardly extending portion 12 of each of the members 10 is horizontally secured a cross-head 13 which carries a series of forwardly-extending tines 14, which may be secured at their rear ends to the cross-head in any suitable manner, but, by preference, a cross-head of the construction and the means for securing the tines to the cross-head, hereinafter described, will be used. In this preferred construction the cross-head comprises two pieces 15 and 16 of angle iron, the upright portions of each of which are provided with a series of openings 17 in which the rear portions of the tines are located at suitable distances apart and in parallelism with one another. As shown in Fig. 6 the horizontal portion of the angle iron piece 15 rests at its upper end on the inner surface of the upright portion of the angle iron piece 16, and the horizontal portion of the latter named piece rests against the inner surface of the lower part of the upright portion of the piece 15, thus forming a bar or head rectangular in cross-section.

Each of the horizontal portions of the angle iron pieces is provided with a series of holes to receive bolts 18 which have heads on one of their ends and are screw-threaded at their other ends to engage nuts 19 used for securing the pieces 15 and 16 together, and also, for more securely retaining the tines 14 in position, each of which is formed near its rear end on one of its sides with a vertical recess 20 to receive portions of the bolts.

Located on the inner surface of each of the horizontal portions of the pieces 15 and 16 are a series of shims 21, each of which is provided with a groove 22 to receive the upper and lower edges of the tines 14, and these shims are also provided with holes through which the bolts 18 are extended. By this construction and arrangement of the parts, it is apparent that the tines 14 will be securely held in position at their rear ends on the cross-head 13, the ends of which may be secured to the side members 10 of the carrier-body in any suitable manner.

Pivotally secured to the extensions 12 of the side members 10 and rearwardly of the cross-head 13 are the rear ends of the arms 23 of the bail of the carrier which arms are extended upwardly then forwardly and bent to meet at a point above and near the front ends of the tines. On the front portions of the arms 23 of the bail is journaled a pulley 24 around which the cable or rope 25 used for drawing the carrier passes. The rear portions of the arms 23 of the carrier bail are connected by means of a rod or axle 26 which has extensions 27 projecting to a considerable distance on each side of the carrier-body, and this rod or axle not only serves to brace the arms 23 at their rear portions, but will also act in conjunction with certain instrumentalities (hereinafter mentioned) on an inclined chute for causing or permitting the carrier to tilt or partially rotate at the proper point on the inclined chute to dump its load.

Mounted on the outer portions or extensions 27 of the axle 26 are wheels 28 which are of considerable size and are used to facilitate the movement of the carrier on the ground while it is accumulating a load and also on the chute both in its ascent and descent thereon. Instead of extending the axle 26 entirely across the body of the carrier and through the rear portions of the arms 23 of the bail and mounting wheels thereon as shown in Fig. 1, I may sometimes provide each of the arms 23 of the bail, as shown in Fig. 4, with an outwardly and lateral extending rod or extension 27$^a$ located above their pivot points, and omit the wheels and the portion of the shaft 26 between the arms, in which construction the rods or extensions 27$^a$ will co-act with instrumentalities on the chute to cause or permit the carrier to tilt or partially rotate at a suitable point on the chute to dump its load and to be started rearwardly on the chute, as will be hereinafter explained.

In Fig. 2 of the drawings is shown the upper portion of an inclined chute, and in Fig. 8 is shown a complete inclined chute and support therefor, in conjunction with which the fork or carrier is adapted to operate. The frame of the inclinable chute consists of a floor 29 and upright side pieces 30 at each of the side edges of the floor, and a forked support 31 for the front or upper end of the chute when in its elevated position to permit the wagon or other receptacle to be driven thereunder. The chute is preferably mounted by means of brace-bars 32 and 33 secured at one of their ends to each of the side pieces 30 on a wheeled axle 34, which bars have their other ends connected to said axle so that the chute may be easily moved from one place to another and placed in an inclined position when desired. As shown in the last-named figures of the drawings the floor 29 of the chute terminates at some distance below the upper ends of the side pieces 30, thus providing an opening through which the tines of the fork or carrier may pass in the operation of dumping its load. The upper end of the chute is provided with an extension, which is designated as a whole by the reference numeral 35, and consists of two parallel side pieces 36 secured at one of their ends to the upper portions of the sides 30 of the chute, a cross-piece 37 which unites their front ends and a cross-piece 38 which unites the upper ends of the sides of the chute at about their juncture with the sides of the chute extension.

Journaled on a suitable bracket 39 secured to the middle portion of the rear cross-piece 37 of the chute-extension is a grooved pulley 40, and journaled on a bracket 41 secured to about the middle portion of the cross-piece 38 of the extension is another grooved pulley 42, which pulleys are for the support of the rope or cable 25 which is attached at one of its ends to the bail of the fork or carrier and may be connected at its other end to a horse or other suitable power employed for drawing the carrier while being loaded and up the inclined chute. The middle front portion of the cross-piece 37 is provided with an apertured bracket 43 to receive a projection 44 on the upper end of the support 31, the lower ends of which are preferably provided with spurs 45 to anchor the same in the ground or floor on which they rest when supporting the chute in its inclined position. The lower portion of the support 31 is provided with a cross-piece 46 on which is journaled a grooved pulley 47 under which the cable 25 is extended. As shown in Figs. 2 and 8 the upper end of the floor 29 of the chute is provided at each of its sides with an extension or track 48 on which the wheels 28 of the carrier may travel when the same are used, in order that the carrier may pass far enough above the upper end of the floor to tilt and dump its load. Each of the sides 30 of the chute is provided with a block or stop 49 located near the upper ends of the tracks 48, and said blocks or stops are employed as buffers to stop the forward movement of the wheels of the carrier. Secured to each of the sides of the chute is a depending bracket 50 which are located at or near the upper end of the floor of the chute. On each of the brackets 50 is pivotally secured at its lower end a lever 51 the upper end of each of which extends somewhat above the sides 30 of the chute and is provided with a number of recesses 52 to receive the extensions 27 or 27ᵃ on the bail of the carrier, and said recessed portions are united at their upper ends by a cross-piece 53 so as to cause them to act conjointly on said extensions. Each of the levers 51 is actuated by means of a spring 54, one end of which is connected to the chute and the other end to the lever between its ends, and the levers are movably held in place against the sides 30 by means of straps 55 secured at their ends to the said sides.

The operation of my fork or carrier is simple and as follows:—When the carrier constructed as shown in Figs. 1, 2 and 3 of the drawings has been loaded by a forward movement into a pile of manure or other material, which movement is caused by power applied to the rope or cable passing over or on the pulleys of the apparatus, it will be caused to ascend the inclined chute until the wheels 28 strike the stops 49 on the side rails of the chute, thus preventing further forward movement of the carrier and permitting the same to be tilted and its load dumped through the instrumentality of the gravity of the latter. As soon as the load shall have been discharged from the tines or support therefor and the rope 25 slackened, it is evident that the weight of the carrier and the action of the wheels thereof will cause it to descend on the chute, in the beginning of which operation the tines 14 or support for the load will be drawn across the top of the floor 29 of the chute and thus remove manure and other material clinging thereto.

When the wheeled construction of the carrier is employed I prefer to use the stops 49 on the sides of the chute for preventing further forward movement of the carrier at the dumping point on the chute, but in some instances I may dispense with the stops 49 and employ the spring-actuated levers 51 to engage at their upper ends either the outer portion of the hubs of the wheels 28 or the extensions 27 through said hubs of the axle 26 on which the wheels are mounted.

When the carrier is constructed as shown in Fig. 4 and above-described the operation is substantially the same as above set forth, except that the lateral projections 27ᵃ on the rear portion of the arms of the bail will engage the upper portions of the levers 51 when the carrier reaches the dumping point on the chute. In either of the constructions of the carrier shown in Fig. 1 and Fig. 4, it is apparent that when the spring-actuated levers 51 are employed they will gradually restrict the forward movement of the carrier and then entirely stop its movement until it has been tilted and its load dumped, after which the springs 54 will exert themselves so as to cause the backward movement of the carrier and its descent on the chute which operation the wheels 28 when employed will greatly facilitate.

It will be understood that the elements of the carrier which co-act with the spring-actuated levers 51 and stops 49 on the chute are located on the bail of the carrier, and that the side members 10, cross-head 13 and tines 14, or their equivalents, constitute the material-supporting-body-portion of the carrier.

In Fig. 8 of the drawings I have shown the front ends of the arms of the bail provided with means for increasing or decreasing the rate of speed of the carrier, which consists in securing one end of the cable or rope 25 to the front or upper part of the chute and usually to an eye 56 on the cross-piece 37 of the chute-extension, and then passing the cord over a grooved pulley 57 on the cross-piece 38 and then around the grooved pulley 24 on the arms of the bail and then up over the pulleys 42 and 40 and then under the pulley 47 on the lower portion of the support for the chute. A weight 58 is movably suspended on the cable 25 between the secured end thereof, and the pulley 57 and a spool or projection 59 is fixed on the cable 25 at a suitable point from the pulley 24 on the bail, so that when the carrier is being moved forwardly on the ground or to accumulate its load it will be caused to move quite slowly by reason of the double action of the strands 60 and 61 of the cable on the pulley 24 until the carrier shall have advanced far enough for the spool or stop 59 to engage the pulley 24, when it is obvious that the cable will be drawn up the chute by means of the single strand 61, in which operation the strand 60 above the stop or spool 59 will become slack and inert, and to take up this slack the weight 58 is employed.

Having thus fully described my invention, what I claim as new, and desire to secure by Letters-Patent, is—

1. A fork or carrier comprising a material-supporting body - portion, a bail pivotally secured to the sides of the body of the carrier, and means on the bail to coöperate with stopping means near the path traveled by the carrier to prevent its further forward movement whereby it will tilt and discharge its load.

2. A fork or carrier comprising a material-supporting body-portion, a forked bail pivotally secured at its rear ends to the sides of the body, and means on the bail to coöperate with stopping means near the path traveled by the carrier to prevent its further forward movement whereby it will tilt and discharge its load.

3. A fork or carrier comprising a material-supporting-body-portion, a bail pivotally secured at its rear ends to the body of the carrier, an outward lateral projection on each of the arms of the bail to co-act with stopping means near the path traveled by the carrier to prevent its further forward movement whereby it will tilt and discharge its load.

4. A fork or carrier comprising a material-supporting-body-portion, a bail pivotally secured at its rear ends to the lower portion of the sides of the carrier, an outward lateral projection on each of the arms of the bail, and a wheel mounted on each of said projections, whereby means are provided to co-act with stopping means near the path traveled by the carrier to prevent its further forward movement and to permit it to tilt and discharge its load.

5. A fork or carrier consisting of a material-supporting-body-portion, a bail pivotally secured at its rear ends to the sides of the body, a rod transversely uniting the arms of the bail and projecting outwardly from each to co-act with stopping means near the path traveled by the carrier to prevent its further forward movement and to permit it to tilt and discharge its load.

6. A fork or carrier consisting of a material-supporting-body-portion, a bail pivotally secured at its rear ends to the sides of the body, a rod transversely uniting the arms of the bail and extending outwardly from each, and a wheel mounted on each of said outward extensions of said rod, whereby means are provided to co-act with means in their path of travel to prevent the further forward movement of the carrier and to permit it to tilt and discharge its load.

7. A fork or carrier consisting of two upright spaced-apart side members, a cross-head transversely uniting the same at their lower portions, means carried on the cross-head to support the material, a bail pivotally connected at its rear ends to the side members, and an outward laterally extending projection on each of the arms of the bail above the cross-head.

8. A fork or carrier consisting of two upright spaced-apart side members, a cross-head transversely uniting the same, means on the cross-head to hold the material, a bail pivotally connected at its rear ends to the side members at points to the rear of the cross-head, an outward laterally extending projection on each arm of the bail, and a wheel mounted on each of said projections.

9. A fork or carrier consisting of two upright spaced-apart side members, a cross-head transversely uniting the same at their lower portions, said cross-head comprising two pieces angular in cross-section secured together so as to form a rectangular figure in cross-section and provided in their upright portions with a series of spaced-apart and registering openings, a series of tines located in said openings and a series of shims located on the inner surfaces of the horizontal portions of the angle pieces of the cross-head and having channels to receive the upper and lower edges of the tines.

10. A fork or carrier consisting of two upright spaced-apart side members, a cross-head transversely uniting the same at their lower portions, said cross-head comprising two pieces angular in cross-section and located with respect to one another so as to form a rectangular figure in cross-section and provided in their upright portions with a series of spaced-apart and registering openings and in their horizontal portions with openings for the reception of securing bolts, a series of tines located in said openings and each having near its rear end a vertical groove to receive the securing bolts and a series of shims located on the inner surfaces of the horizontal portions of the angle pieces of the cross-head and having channels to receive the upper and lower edges of the tines.

11. A cross-head and material-support for a manure fork or carrier comprising two pieces angular in cross-section and located with respect to one another so as to form a rectangular figure in cross-section and provided in their upright portion with a series of spaced-apart and registering openings and in their horizontal portions with openings for the reception of securing bolts, a series of tines located in said openings in the upright parts of the angular pieces and each having near its rear end a vertical groove to receive the securing bolts, and a series of shims located on the inner surfaces of the horizontal portions of the angle pieces of the cross-head and having channels to receive the upper and lower edges of the tines.

12. A cross-head and material-support for a manure fork or carrier comprising two pieces angular in cross-section and located with respect to one another so as to form a rectangular figure in cross-section and provided in their upright portions with a series of spaced-apart and registering openings and in their horizontal portions with openings for the reception of securing-bolts, a series of tines located in said openings in the upright parts of the angle pieces and each having near its rear end a vertical groove to receive the securing-bolts, and a series of shims located on the inner surface of either the upper or lower horizontal portion of the cross-head and having channels to receive the edges of the tines.

LE GRAND KNIFFEN.

Witnesses:
   CHAS. C. TILLMAN,
   M. A. NYMAN.